(12) United States Patent
Bantle

(10) Patent No.: US 6,322,305 B1
(45) Date of Patent: Nov. 27, 2001

(54) MOUNTING ELEMENT USED IN FURNITURE BUILDING

(75) Inventor: Ulrich Bantle, Empfingen (DE)

(73) Assignee: Karl Simon GmbH & Co. KG, Aichhalden (DE)

( * ) Notice: Subject to any disclaimer, the term of this patent is extended or adjusted under 35 U.S.C. 154(b) by 0 days.

(21) Appl. No.: 09/541,295

(22) Filed: Apr. 3, 2000

(30) Foreign Application Priority Data

Apr. 1, 1999 (DE) ................................................ 199 15 119

(51) Int. Cl.[7] ............................ A16B 13/04; A16B 13/06
(52) U.S. Cl. ................................ 411/41; 411/48; 411/72; 411/182
(58) Field of Search ................................ 411/41, 45, 46, 411/48, 71, 72, 182

(56) References Cited

U.S. PATENT DOCUMENTS

| | | | |
|---|---|---|---|
| 4,840,523 | * | 6/1989 | Oshida ........................ 411/72 X |
| 4,856,950 | * | 8/1989 | Bushnell ...................... 411/72 X |
| 5,163,795 | * | 11/1992 | Benoit et al. ................. 411/48 X |
| 5,370,484 | * | 12/1994 | Morikawa et al. ............ 411/41 X |
| 5,568,675 | * | 10/1996 | Asami et al. ................. 411/41 X |
| 5,759,002 | * | 6/1998 | Essenberg ..................... 411/41 X |

* cited by examiner

Primary Examiner—Neill Wilson
(74) Attorney, Agent, or Firm—Pauley Petersen Kinne & Fejer

(57) ABSTRACT

A mounting element used in furniture building which is inserted into a bore of a furniture element and fixed in place therein. The mounting element includes a fastening sleeve and a connecting pin wherein the fastening sleeve is divided into deflectable holding springs and is inserted into the bore of the furniture element. The holding springs have tooth elements on an exterior and enclose a centered receptacle for the connecting pin. The connecting pin has a fastening receptacle or threaded receptacle and is connected in one piece with the fastening sleeve by gates which act as predetermined breaking points. The connecting pin is secured by the gates in a prepared position, ready to be driven. A connecting pin produced separately from the fastening sleeve is secured by partially inserting the connecting pin into the receptacle of the fastening sleeve in a prepared position, ready to be driven.

21 Claims, 4 Drawing Sheets

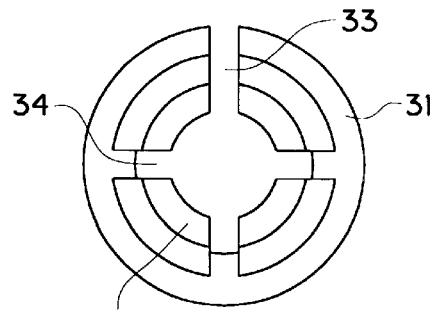
FIG. 2
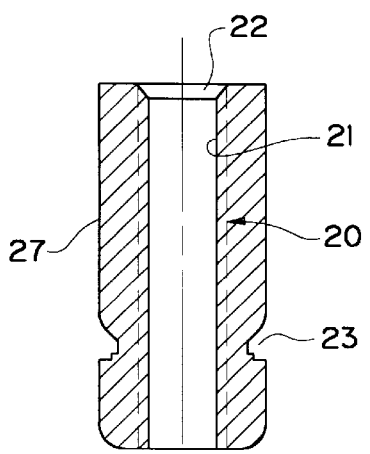
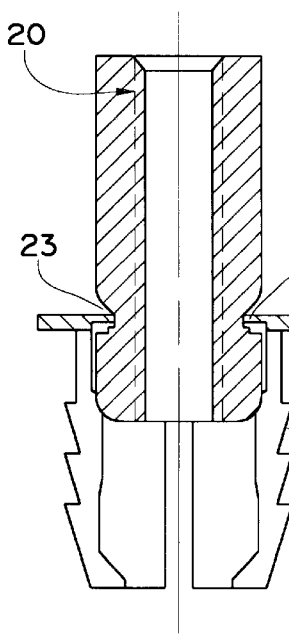
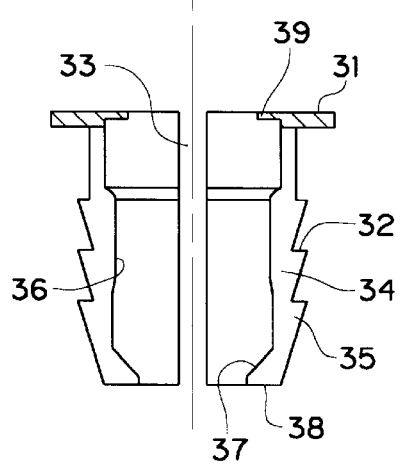
FIG. 3
FIG. 4
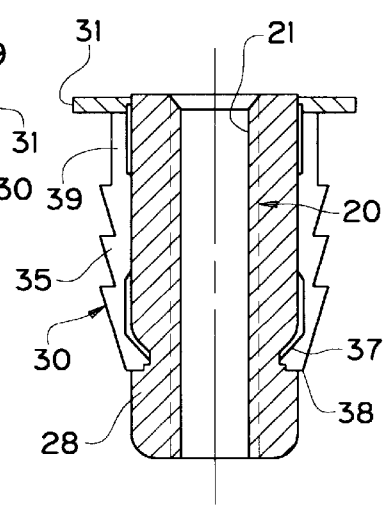
FIG. 5
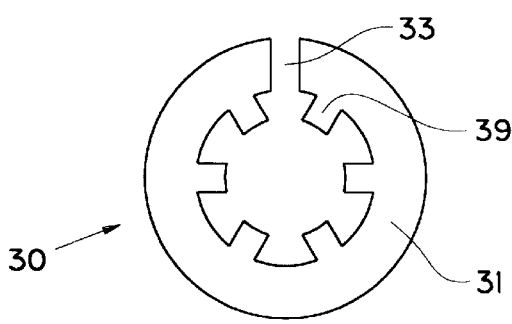
FIG. 6

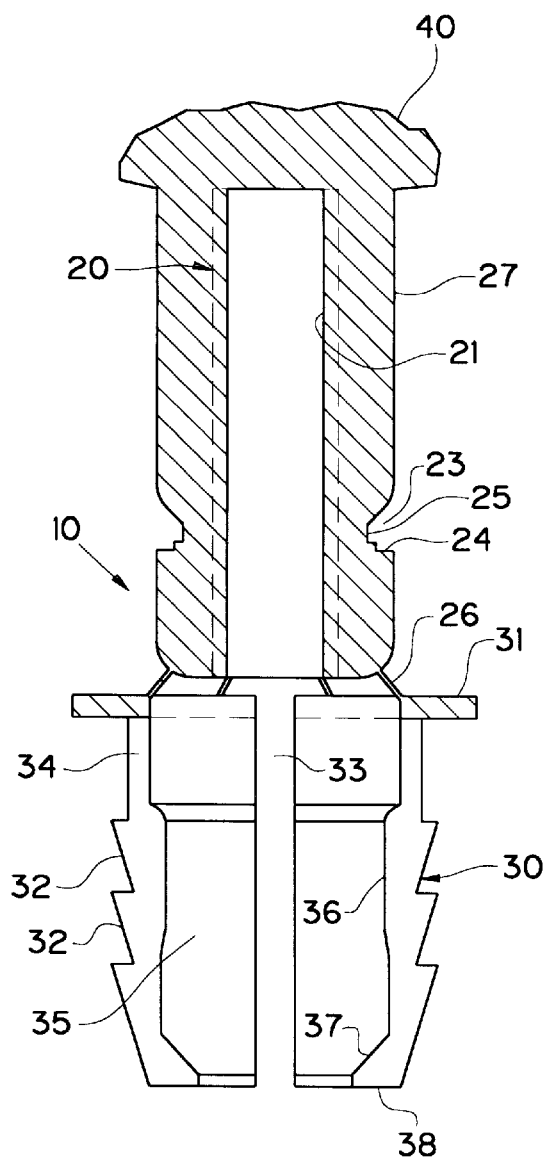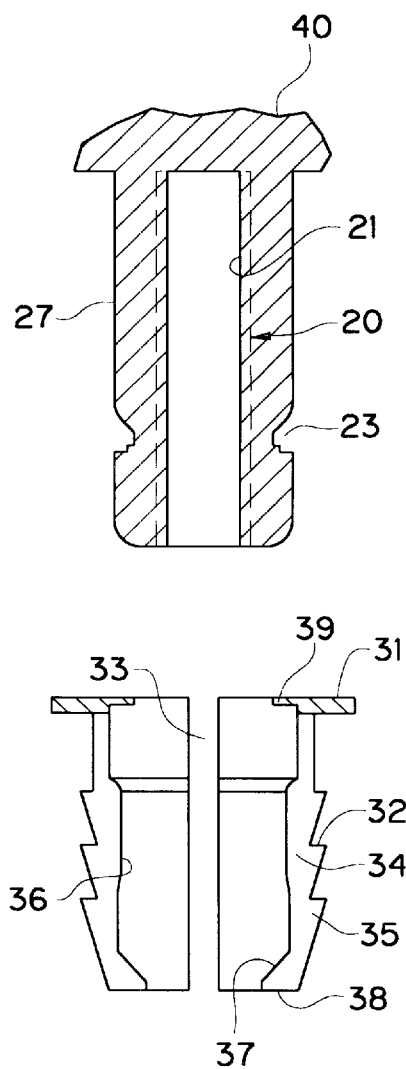
FIG. 8
FIG. 9

MOUNTING ELEMENT USED IN FURNITURE BUILDING

BACKGROUND OF THE INVENTION

Field of the Invention

This invention relates to a mounting element used in furniture building which can be inserted into a bore of a furniture element and fixed in place therein.

In connection with the building of furniture in particular, diverse mounting elements are required for connecting furniture elements, or for attaching diverse furniture fittings to a furniture element. A bore in the furniture element is often embodied as a blind bore, and the mounting element is in two pieces, wherein one part is inserted into the bore of the furniture element and is fixed therein. The part inserted into the furniture element is cup-shaped and is held in the bore of the furniture element by snug press fit alone.

SUMMARY OF THE INVENTION

It is one object of the invention to provide a mounting element for use in furniture building which is simple in construction and cost-effecting in manufacture, but can still be used for diverse purposes in furniture building.

In accordance with this invention, this object is achieved by a mounting element comprising a fastening sleeve and a connecting pin, wherein the fastening sleeve is divided into deflectable holding springs and is inserted into a bore of a furniture element, a the holding springs having tooth elements on an exterior and enclose a centered receptacle for the connecting pin. The connecting pin has a fastening receptacle or threaded receptacle, and the connecting pin is connected in one piece with the fastening sleeve by gates which act as predetermined breaking points and secure the connecting pin in a prepared position for being driven in the fastening sleeve. In another embodiment the object is achieved by a mounting element comprising a fastening sleeve and a connecting pin, wherein the fastening sleeve is divided into deflectable holding spring and is inserted into a bore of a furniture element. The holding springs have too elements on their exterior and enclose a centered receptacle for the connecting pin. The connecting pin is produced separately from the fastening sleeve, has a fastening receptacle or threaded receptacle, and is inserted into the receptacle of the fastening sleeve enclosed by the holding springs.

Use of the mounting element is considerably improved by the spreading of the holding springs of e fastening sleeve in the course of driving, or pushing, the connecting pin into the fastening sleeve already inserted into the bore of the furniture element. The connecting pin connected with the fastening sleeve and having a fastening receptacle or threaded receptacle provides a simple seating or screwing option for attaching a second furniture element or a furniture fitting. In this embodiment the connecting pin is maintained or brought into the prepared driving position allowing an easy and simple connection between the connecting pin and the fastening sleeve. The fastening sleeve and the connecting pin are produced as a one-piece mounting element or, in case of separate manufacture, they are brought in a simple way into the prepared driving position.

In one embodiment of a fastening sleeve holding springs are connected with each other by a disk on a front. In one embodiment the disk has a slit which preferably coincides with a slit which divides the fastening sleeve into the holding springs, so the fastening sleeve can also be deflected in the area of the disk and can be clamped in the bore of the furniture element.

In one embodiment of this invention exterior faces of the connecting pin and the interior surface of the holding springs are designed as smooth sliding surfaces resulting in an easier drive-in process of the connecting pin into the fastening sleeve.

In one embodiment of this invention securing the connecting pin in the receptacle by the holding springs is improved by detent shoulders with detent surfaces on a front face of the fastening sleeve facing away from the disk which snap into a circumferential detent groove of the connecting pin forming a connection which is practically non-releasable.

In one embodiment the detent groove and/or the detent shoulders have at least one detent step.

In one embodiment of this invention insertion of the fastening sleeve into the bore of the furniture element is limited by the disk contacting the furniture element.

In one embodiment of this invention access of a fastening means to the fastening bore or threaded bore of the connecting pin is made easier in that the fastening receptacle of threaded receptacle embodied as a fastening bore or threaded bore is provided with a continuously widening insertion opening for the connecting pin.

The fastening means can be a self-tapping screw, or a normal screw, matched to the threaded bore.

In one embodiment of this invention snap-in connection between the connecting pin and the fastening sleeve is improved in that the detent steps of the connecting pin and/or the detent surfaces of the detent shoulders of the holding springs of the fastening sleeve have roughened surfaces.

In one embodiment of this invention mounting outlay is reduced by forming the connecting pin and the fastening sleeve, or the connecting pin separated from the fastening sleeve, in one piece on a furniture fitting.

In one embodiment of this invention the connecting pin and the fastening sleeve form a one-piece mounting element having gates at the transition to the connecting pin. The gates have predetermined breaking points that, when driving the connecting pin into the receptacle of the fastening sleeve, break off and are guided into the receptacle of the fastening sleeve as centering tabs for the connecting pin.

In one embodiment of this invention the connecting pin and the fastening sleeve are manufactured as separate elements having tabs which project into the receptacle of the fastening sleeve in an area of an insertion side which, when driving the connecting pin into the fastening sleeve, are deflected into the receptacle and act as centering tabs for the connecting pin.

In one embodiment of this invention the connecting pin is a connecting bolt having two detent grooves for connection with two fastening sleeves. Therefore it is possible in a simple manner to connect two furniture elements with each other in a simple way.

A possible embodiment of the invention secures the connecting pin of the receptacle of the fastening sleeve in a prepared position for being driven in.

BRIEF DESCRIPTION OF THE DRAWINGS

This invention will be explained in greater detail by referring to exemplary embodiments represented in the drawings wherein:

FIG. 1 shows a one-piece mounting element, comprising a connecting pin and a fastening sleeve, on an enlarged scale in a prepared position for being driven in;

FIG. 2 shows a plan view on the front face of the fastening sleeve in FIG. 1;

FIG. 3 shows a two-piece mounting element in section;

FIG. 4 shows the connecting pin and the fastening sleeve of the mounting element in the prepared position for being driven in;

FIG. 5 shows the mounting element in the final mounting position, i.e. the position for being driven in;

FIG. 6 shows a plan view on the front face of the fastening sleeve in FIG. 3;

FIG. 7 shows a one-piece mounting element comprising a connecting bolt and two fastening sleeves the prepared position for being driven in;

FIG. 8 shows a one-piece mounting element formed in one piece on a furniture fitting; and FIG. 9 shows a two-piece mounting element wherein the connecting pin is formed on a furniture fitting.

DESCRIPTION OF PREFERRED EMBODIMENTS

Figure 1:
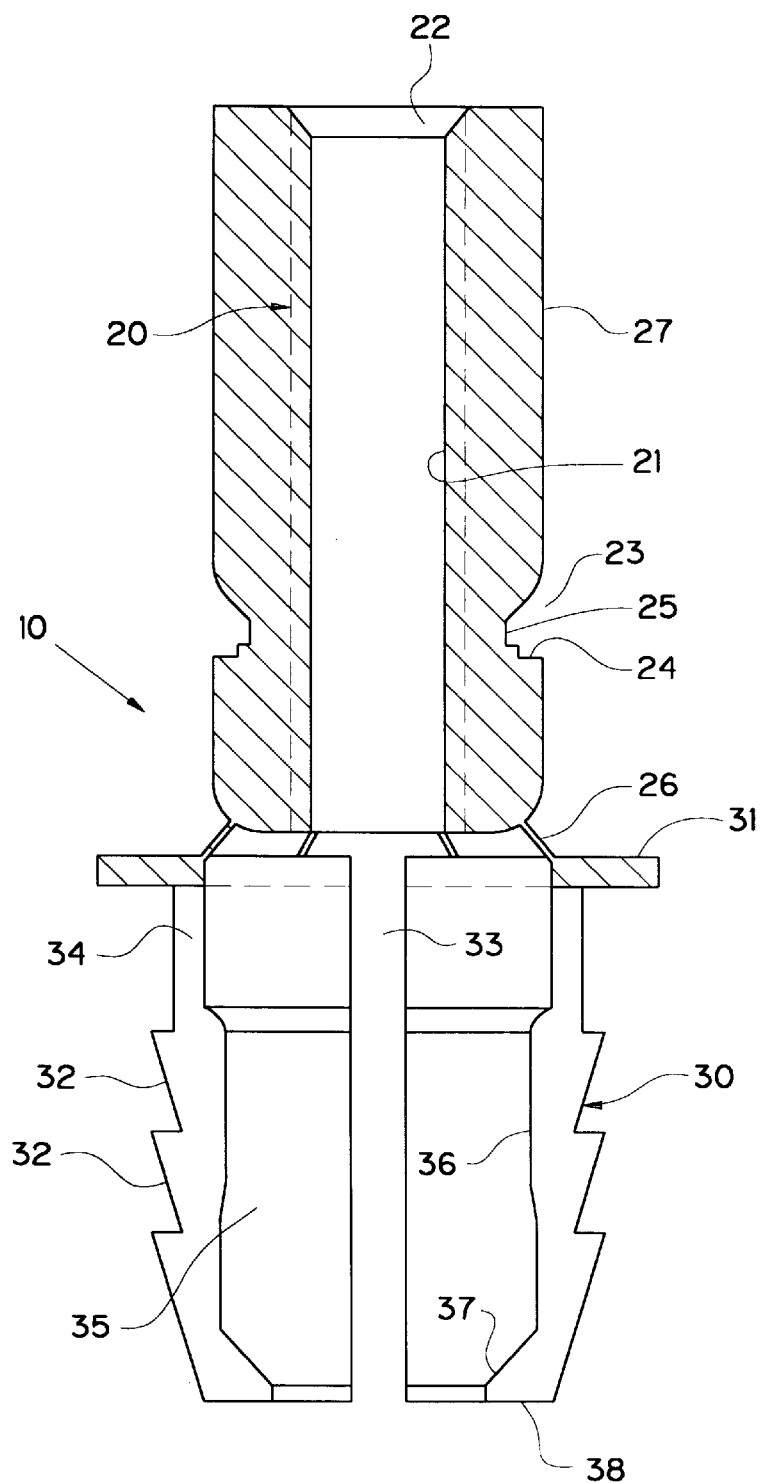
Figure 7:
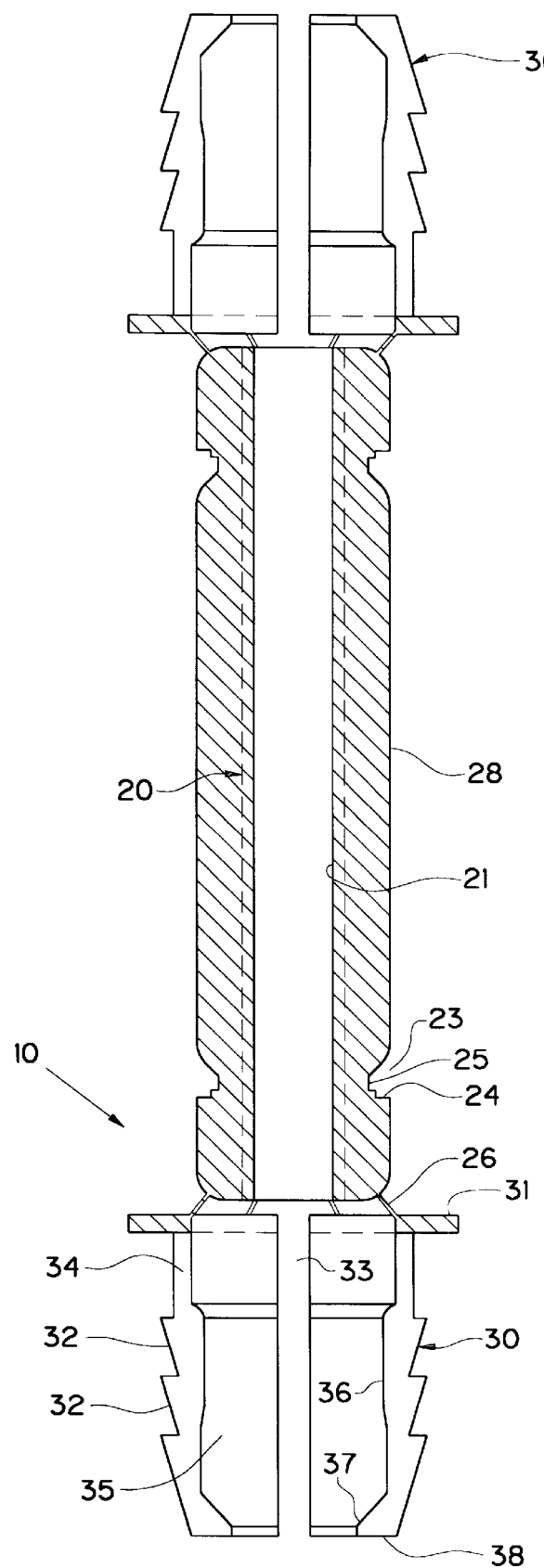

FIG. 1 shows connecting pin 20 of a one-piece mounting element 10 having a centered fastening bore or threaded bore 21, which terminates at a front in an insertion opening 22, which widens conically. Exterior surface 27 of the connecting pin 20 is embodied as a smooth conical sliding surface which widens in the direction toward the insertion opening 22 so the pin can be easily driven into the receptacle of a fastening sleeve 30. The fastening sleeve 30 is formed in one piece by means of gates 26 on the connecting pin 20. In a transition area to the connecting pin 20, the gates 26 are designed as predetermined breaking points so that, in the course of being driven in, the connecting pin 20 is severed from the gates 26 and the gates 26 are guided as centering tabs into the receptacle of the fastening sleeve 30. The centering tabs fix an end area of the connecting pin 20 in an initial section of the receptacle of the fastening sleeve 30.

A front face of the fastening sleeve 30 facing the connecting pin 20 is formed by a ring-shaped disk 31 which limits the insertion movement of the fastening sleeve 30 into a bore in a furniture element by coming to rest against the furniture element.

In the initial area, the guided centering tabs of the gates 26 rest against the inner wall of the fastening sleeve 30, which is formed by holding springs 35. The holding springs 35 are divided by slits 33 and 34 in the fastening sleeve 30, so the holding springs 35 are deflected when the bolt-like, correspondingly dimensioned connecting pin 20 is driven into the fastening sleeve 30. Exterior surfaces 27 of the connecting pin 30 slide on the smooth interior surfaces 36 of the holding springs 35 until detent shoulders on free ends of the holding springs 35 snap into a circumferential detent groove 23 of the connecting pin 20. Interior surfaces 36 can also be conically designed and widen in a direction toward the gates 26. Conical interior surfaces 36 and conical exterior surfaces 27 generate a wedge effect which aids the spreading of the holding springs 35. The detent groove 23 has two detent steps 24 and 25, and the detent shoulders of the holding springs 35 have a detent surface 38 having a rough surface, the same as the detent steps 24 and 25, improving cohesion.

A distance of the detent groove 23 from a front face of the connecting pin 20 with the insertion opening 22 is approximate to a distance of the detent shoulders with the detent surface 38 of the holding spring 35 from the disk 31, so that in the driven-in position the connecting pin 20 terminates approximately flush with the fastening sleeve 30 fixed in place in the furniture element. The holding springs 35 are expanded outward and tooth elements 32 hook in a frictionally connected manner in the furniture element on the exterior surfaces of the holding springs 35 and securely support the fastening sleeve 30 in the furniture element. Notches in an area of the tooth elements 32 act as functional pivot bearings for the elements of the holding spring.

The slit 33 can extend into the disk 31 so that the fastening sleeve 30 is pushed apart in an area of the disk 3 land is clampingly held in the bore of the furniture element, as shown in FIG. 2.

In one embodiment the mounting element 10 has separately produced elements—connecting pin 20 and fastening sleeve 30—as shown in FIGS. 3 to 6 that corresponds to the mounting element 10 as shown in FIGS. 1 and 2.

As shown in FIGS. 3–6 tabs 39 in an area of the slit disk 31 of the fastening sleeve 30 project into the receptacle and, as shown in FIG. 4, snap into the detent groove 23 of the connecting pin 20 when the connecting pin 20 is brought into the prepared position for being driven in. The final detent position as shown in FIG. 5 is equivalent to the driving-in position of the mounting element 10 in accordance with FIGS. 1 and 2. Tabs 39 are guided into the receptacle of the fastening sleeve 30 and are used as centering tabs. In place of the centering tabs it is also possible to use an annular, circulating lip-shaped collar. All variations in the area of the fastening bore or threaded bore 21 and the forming of the connecting pin 20 on a furniture fitting element 40, as shown in FIGS. 8 and 9, can also be transferred in the same way to the two-piece mounting element 10 as shown in FIGS. 3 to 6.

FIG. 9 shows an embodiment comprising a connecting bolt 28. Connecting bolt 28 has two detent grooves allowing connection to two fastening sleeves 30. Connecting bolt 28 can embody the variations of connecting pin 20 as shown in FIGS. 1–6.

What is claimed is:

1. In a mounting element used in furniture building, which can be inserted into and fixed within a bore of a furniture element, the improvement comprising:

a fastening sleeve (30) and a connecting pin (20), the fastening sleeve (30) divided into a plurality of deflectable holding springs (35) and insertable within the bore of the furniture element, each of the holding springs (35) having a plurality of tooth elements (32) on an exterior, the holding springs (35) enclosing a receptacle for the connecting pin (20), the connecting pin (20) having one of a fastening receptacle and a threaded receptacle (21), the connecting pin (20) connected in one piece with the fastening sleeve (30) by a plurality of gates (26) acting as predetermined breaking points, and the connecting pin (20) maintained in a position for being driven, and the fastening sleeve (30) with the holding springs (35) forming a plurality of detent shoulders with detent surfaces (37, 38) on a front face facing away from a disk (31) which snap into a circumferential detent groove (23) of the connecting pin (20).

2. In the mounting element in accordance with claim 1, wherein the holding springs (35) are connected with each other by a disk (31) on a front.

3. In the mounting element in accordance with claim 1, wherein a plurality of exterior faces (27) of the connecting pin (20) and a plurality of interior surfaces (36) of the holding springs (35) have smooth sliding surfaces.

4. In the mounting element in accordance claim 1, wherein an insertion position of the fastening sleeve (30) is limited by the disk (31) contacting the furniture element.

5. In a mounting element used in furniture building, which can be inserted into and fixed within a bore of a furniture element, the improvement comprising:

a fastening sleeve (30) and a connecting pin (20), the fastening sleeve (30) divided into a plurality of deflectable holding springs (35) and insertable within the bore of the furniture element, the holding springs (35) connected with each other by a disk (31) on a front, the disk (31) having a slit (33) which coincides with a slit (34) dividing the fastening sleeve (30) into the holding springs (35), each of the holding springs (35) having a plurality of tooth elements (32) on an exterior, the holding springs (35) enclosing a receptacle for the connecting pin (20), the connecting pin (20) produced separately from the fastening sleeve (30) and having one of a fastening receptacle and a threaded receptacle (21), and the connecting pin (20) insertable into the fastening receptacle of the fastening sleeve (30) which is enclosed by the holding springs (35).

6. In the mounting element in accordance with claim 2, wherein the connecting pin (20) of the fastening receptacle of the fastening sleeve (30) is maintained in a position for being driven.

7. In the mounting element in accordance with claim 2, wherein a plurality of exterior faces (27) of the connecting pin (20) and a plurality of interior surfaces (36) of the holding springs (35) have smooth sliding surfaces.

8. In the mounting element in accordance with claim 5, wherein the fastening sleeve (30) with the holding springs (35) forms a plurality of detent shoulders with detent surfaces (37, 38) on a front face facing away from the disk (31) which snap into a circumferential detent groove (23) of the connecting pin (20).

9. In the mounting element in accordance with claim 6, wherein at least one of the detent groove (23) and the detent shoulders have detent steps (24, 25).

10. In the mounting element in accordance with claim 7, wherein an insertion position of the fastening sleeve (30) is limited by the disk (31) contacting the furniture element.

11. In the mounting element in accordance with claim 8, wherein the fastening receptacle of threaded receptacle has a continuously widening insertion opening (22) for the connecting pin (20).

12. In the mounting element in accordance with claim 9, wherein the detent steps (24, 25) of the connecting pin (20) and the detent surfaces (37, 38) of the detent shoulders of the holding springs (35) of the fastening sleeve (30) have roughened surfaces.

13. In the mounting element in accordance with claim 10, wherein at least one of the connecting pin (20) and the fastening sleeve (30) is formed in one piece on a furniture fitting.

14. In a mounting element used in furniture building, which can be inserted into and fixed within a bore of a furniture element, the improvement comprising:

a fastening sleeve (30) and a connecting pin (20), the fastening sleeve (30) divided into a plurality of deflectable holding springs (35) and insertable within the bore of the furniture element, each of the holding springs (35) having a plurality of tooth elements (32) on an exterior, the holding springs (35) enclosing a receptacle for the connecting pin (20), the connecting pin (20) produced separately from the fastening sleeve (30) and having one of a fastening receptacle and a threaded receptacle (21), the connecting pin (20) insertable into the fastening receptacle of the fastening sleeve (30) which is enclosed by the holding springs (35), and an area of an insertion side having a plurality of tabs (39) projecting into the receptacle of the fastening sleeve (30) which when driving the connecting pin (20) into the fastening sleeve (30) can be deflected into the fastening receptacle and act as centering tabs for the connecting pin (20).

15. In the mounting element in accordance with claim 13, wherein the connecting pin (20) a connecting bolt having two detent grooves for connecting with two of the fastening sleeves (30).

16. In the mounting element in accordance with claim 14, wherein the connecting pin (20) of the fastening receptacle of the fastening sleeve (30) is maintained in a position for being driven.

17. In a mounting element used in furniture building, which can be inserted into and fixed within a bore of a furniture element, the improvement comprising:

a fastening sleeve (30) and a connecting pin (20), the fastening sleeve (30) divided into a plurality of deflectable holding springs (35) and insertable within the bore of the furniture element, each of the holding springs (35) having a plurality of tooth elements (32) on an exterior, the holding springs (35) enclosing a receptacle for the connecting pin (20), the connecting pin (20) having one of a fastening receptacle and a threaded receptacle (21), the connecting pin (20) connected in one piece with the fastening sleeve (30) by a plurality of gates (26) acting as predetermined breaking points, and the connecting pin (20) maintained in a position for being driven, and the gates (26) at a transition to the connecting pin (20) forming predetermined breaking points, and when driving the connecting pin (20) into the receptacle of the fastening sleeve (30) the gates (26) breaking off and guidable as tabs for centering the connecting pin (20) in the receptacle of the fastening sleeve (30).

18. In a mounting element used in furniture building, which can be inserted into and fixed within a bore of a furniture element, the improvement comprising:

a fastening sleeve (30) and a connecting pin (20), the fastening sleeve (30) divided into a plurality of deflectable holding springs (35) and insertable within the bore of the furniture element, each of the holding springs (35) having a plurality of tooth elements (32) on an exterior, the holding springs (35) enclosing a receptacle for the connecting pin (20), the connecting pin (20) having one of a fastening receptacle and a threaded receptacle (21), one of a fastening receptacle and a threaded receptacle having a widening insertion opening (22), and the connecting pin (20) connected in one piece with the fastening sleeve (30) by a plurality of gates (26) acting as predetermined breaking points, and the connecting pin (20) maintained in a position for being driven.

19. In a mounting element used in furniture building, which can be inserted into and fixed within a bore of a furniture element, the improvement comprising:

a fastening sleeve (30) and a connecting pin (20), the fastening sleeve (30) divided into a plurality of deflectable holding springs (35) and insertable within the bore of the furniture element, each of the holding springs (35) having a plurality of tooth elements (32) on an exterior, the holding springs (35) enclosing a receptacle for the connecting pin (20), the connecting pin (20) having one of a fastening receptacle and a threaded receptacle (21), the connecting pin (20) connected in one piece with the fastening sleeve (30) by a plurality of gates (26) acting as predetermined breaking points, and the connecting pin (20) maintained in a position for being driven, and a plurality of detent steps on a circumferential detent groove (23) of the connecting pin (20), the detent steps (24, 25) and a plurality of detent surfaces (37, 38) of detent shoulders of the holding springs (35) of the fastening sleeve (30) having roughened surfaces.

20. In a mounting element used in furniture building, which can be inserted into and fixed within a bore of a furniture element, the improvement comprising:

a fastening sleeve (30) and a connecting pin (20), the fastening sleeve (30) divided into a plurality of deflectable holding springs (35) and insertable within the bore of the furniture element, each of the holding springs (35) having a plurality of tooth elements (32) on an exterior, the holding springs (35) enclosing a receptacle for the connecting pin (20), the connecting pin (20) having one of a fastening receptacle and a threaded receptacle (21), the connecting pin (20) formed in one piece on a furniture fitting, and the connecting pin (20) connected in one piece with the fastening sleeve (30) by a plurality of gates (26) acting as predetermined breaking points, and the connecting pin (20) maintained in a position for being driven.

21. In a mounting element used in furniture building, which can be inserted into and fixed within a bore of a furniture element, the improvement comprising:

a fastening sleeve (30) and a connecting bolt (20), the fastening sleeve (30) divided into a plurality of deflectable holding springs (35) and insertable within the bore of the furniture element, each of the holding springs (35) having a plurality of tooth elements (32) on an exterior, the holding springs (35) enclosing a receptacle for the connecting bolt (20), the connecting bolt (20) having two detent grooves for connecting with two of the fastening sleeves (30), and the connecting bolt (20) connected in one piece with the fastening sleeve (30) by a plurality of gates (26) acting as predetermined breaking points, and the connecting bolt (20) maintained in a position for being driven.

* * * * *